United States Patent
Evans et al.

(10) Patent No.: US 10,272,413 B2
(45) Date of Patent: *Apr. 30, 2019

(54) METHOD FOR PREPARING A SORBENT

(71) Applicant: Johnson Matthey Public Limited Company, London (GB)

(72) Inventors: Matthew James Evans, Durham (GB); Matthew David Gwydion Lunn, Durham (GB); Martin Graham Partridge, Hilton (GB); Christopher John Young, Hartlepool (GB)

(73) Assignee: Johnson Matthey Public Limited Company, London, England (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,007

(22) Filed: Nov. 15, 2017

(65) Prior Publication Data

US 2018/0071711 A1  Mar. 15, 2018

Related U.S. Application Data

(63) Continuation of application No. 15/035,797, filed as application No. PCT/GB2014/053606 on Dec. 4, 2014, now Pat. No. 9,919,286.

(30) Foreign Application Priority Data

Dec. 18, 2013 (GB) .................................. 1322464.7

(51) Int. Cl.

| | |
|---|---|
| *B01J 20/02* | (2006.01) |
| *B01J 20/04* | (2006.01) |
| *B01J 20/06* | (2006.01) |
| *B01J 20/08* | (2006.01) |
| *B01J 20/18* | (2006.01) |
| *B01J 20/28* | (2006.01) |
| *B01J 20/30* | (2006.01) |
| *B01J 20/32* | (2006.01) |
| *B01D 53/64* | (2006.01) |
| *B01J 20/10* | (2006.01) |
| *B01D 15/08* | (2006.01) |
| *B01D 53/04* | (2006.01) |
| *B01J 20/12* | (2006.01) |
| *C10L 3/10* | (2006.01) |

(52) U.S. Cl.
CPC .......... *B01J 20/0285* (2013.01); *B01D 15/08* (2013.01); *B01D 53/04* (2013.01); *B01D 53/64* (2013.01); *B01J 20/0237* (2013.01); *B01J 20/041* (2013.01); *B01J 20/06* (2013.01); *B01J 20/08* (2013.01); *B01J 20/103* (2013.01); *B01J 20/12* (2013.01); *B01J 20/18* (2013.01); *B01J 20/2803* (2013.01); *B01J 20/3028* (2013.01); *B01J 20/3042* (2013.01); *B01J 20/3204* (2013.01); *B01J 20/3236* (2013.01); *B01J 20/3293* (2013.01); *B01J 20/3295* (2013.01); *C10L 3/101* (2013.01); *B01D 2253/1128* (2013.01); *C10L 2290/542* (2013.01); *Y02C 20/20* (2013.01); *Y02E 50/346* (2013.01)

(58) Field of Classification Search
None
See application file for complete search history.

(56) References Cited

U.S. PATENT DOCUMENTS

| | | |
|---|---|---|
| 5,245,106 A | 9/1993 | Cameron et al. |
| 8,177,983 B2 | 5/2012 | Cousins |
| 2007/0037991 A1 | 2/2007 | Rizkalla |
| 2007/0122327 A1 | 5/2007 | Yang et al. |
| 2009/0297885 A1 | 12/2009 | Gadkaree et al. |
| 2010/0320153 A1 | 12/2010 | Cousins et al. |
| 2011/0123422 A1 | 5/2011 | Wang |
| 2012/0135214 A1 | 5/2012 | Dawes et al. |

FOREIGN PATENT DOCUMENTS

| | | |
|---|---|---|
| CN | 102574097 A | 7/2012 |
| CN | 103313770 A | 9/2013 |
| GB | 1042158 A | 9/1966 |
| WO | WO1995022403 | 8/1995 |
| WO | WO1997017307 | 5/1997 |
| WO | WO2009101429 A1 | 8/2009 |
| WO | WO2010061212 A1 | 6/2010 |
| WO | WO 2011/021024 A1 | 2/2011 |
| WO | WO2011021024 A1 | 2/2011 |

OTHER PUBLICATIONS

T.Ohtani, et al., "Synthesis of Binary Copper Chalcogenides by Mechanical Alloying," Materials Research Bulletin, vol. 30, No. 12, p. 1495-1504, 1995.
GB1322464.7, UK Search Report dated Jun. 18, 2014.

*Primary Examiner* — Sheng H Davis
(74) *Attorney, Agent, or Firm* — BakerHostetler

(57) ABSTRACT

A method is described for preparing a sorbent comprising the steps of:
(i) mixing together an inert particulate support material and one or more binders to form a support mixture,
(ii) shaping the support mixture by granulation in a granulator to form agglomerates,
(iii) coating the agglomerates with a coating mixture powder comprising a particulate copper sulphide and one or more binders to form a coated agglomerate, and
(iv) drying the coated agglomerate to form a dried sorbent.

23 Claims, No Drawings

METHOD FOR PREPARING A SORBENT

This application is a continuation of U.S. patent application Ser. No. 15/035,797, filed May 11, 2016, which is a U.S. national stage of International Patent Application No. PCT/GB2014/053606, filed Dec. 4, 2014, and claims the priority of Great Britain Patent Application No. 1322464.7, all applications of which are incorporated by reference.

This invention relates to a method for preparing a sorbent, in particular a method for preparing sorbents comprising copper sulphide.

Copper sulphide containing sorbents may be used to remove heavy metals from fluid streams. Heavy metals such as mercury are found in small quantities in fluid streams such as hydrocarbon or other gas and liquid streams. Arsenic and antimony may also be found in small quantities in hydrocarbon streams. Mercury, in addition to its toxicity, can cause failure of aluminium heat exchangers and other processing equipment. Therefore there is a need to efficiently remove these metals from fluid streams, preferably as early as possible in the process flowsheet.

Copper sorbents are conventionally pelleted compositions or granules formed from precipitated compositions containing copper.

WO2011/021024 discloses a method for making a sorbent comprising the steps of: (i) applying, from a solution or a slurry, a layer of a copper compound on the surface of a support material, and (ii) drying the coated support material, wherein the thickness of the copper compound layer on the dried support is in the range 1-200 µm. In the Examples, the layer of copper compound was formed from a solution of copper ammine carbonate or from a slurry of basic copper carbonate. The precursor was converted to a sorbent suitable for removing heavy metals from liquids or gases by applying one or more sulphur compounds to sulphide the copper compound and form CuS.

Whereas this method provides copper sorbents, there is a need to avoid having to employ a separate sulphiding step.

Accordingly the invention provides a method for preparing a sorbent comprising the steps of:
(i) mixing together an inert particulate support material and one or more binders to form a support mixture,
(ii) shaping the support mixture by granulation in a granulator to form agglomerates,
(iii) coating the agglomerates with a coating mixture powder comprising a particulate copper sulphide and one or more binders to form a coated agglomerate, and
(iv) drying the coated agglomerate to form a dried sorbent.

The invention further provides a sorbent obtainable by the method and the use of the sorbent in removing heavy metals from heavy metal-containing fluid streams.

By "sorbent" we include absorbent and adsorbent.

By "inert particulate support material" we mean that the support material does not comprise a particulate copper compound. Such support materials include alumina, metal-aluminate, silica, titania, zirconia, zinc oxide, aluminosilicates, zeolites, metal carbonate, silicon carbide, carbon, or a mixture thereof. The support material offers a means to adapt the physical properties of the sorbent to the duty. Thus the surface area, porosity and crush strength of the sorbent may suitably be tailored to its use. Support materials are desirably oxide materials, such as aluminas, titanias, zirconias, silicas and aluminosilicates, or mixtures of two or more of these. Hydrated oxides may also be used, for example alumina trihydrate or boehmite. Particularly suitable supports are aluminas and hydrated aluminas, especially alumina trihydrate. The particulate support material is desirably in the form of a powder, more preferably a powder with a $D_{50}$ particle size in the range 1-100 µm, especially 5-20 µm.

Binders that may be used to prepare the agglomerates include clay binders such as bentonite, sepiolite, minugel and attapulgite clays; cement binders, particularly calcium aluminate cements such as ciment fondu; and organic polymer binders such as cellulose binders, or a mixture thereof. Particularly strong agglomerates may be formed where the binder is a combination of a cement binder and a clay binder. In such materials, the relative weights of the cement and clay binders may be in the range 1:1 to 3:1 (first to second binder). The total amount of the binder in the agglomerate may be in the range 5-30% by weight, preferably 5-20% by weight. The one or more binders are desirably in the form of powders, more preferably powder with a $D_{50}$ particle size in the range 1-100 µm, especially 1-20 µm.

The particulate support material and one or more binders are mixed to form a support mixture, which may be achieved by conventional blending techniques. The mixture is then granulated in a granulator to form agglomerates, which provide a core essentially free of copper compounds. The agglomerates may be formed by mixing a powder composition with a little liquid, such as water, insufficient to form a slurry, and then causing the composition to agglomerate into roughly spherical granules in a granulator. The amount of liquid added will vary depending upon the porosity and wettability of the components, but may be 0.1 to 0.5 ml/g of support mixture. Aqueous or non-aqueous liquids may be used, but water is preferred.

Granulator equipment is available commercially. The agglomerates preferably have a diameter in the range 1-15 mm.

The agglomerates may be aged and/or dried before coating to enhance their strength. Ageing and/or drying is preferably performed at 20-50° C. for 1-10 hours, more preferably 5-8 hours.

In a preferred embodiment the agglomerates comprise alumina trihydrate, a cement binder and a clay binder. The preferred amounts of cement and clay binders are 5-15% by weight each, in the agglomerate. Such agglomerates provide a high strength core on which to place the particulate copper compound.

The particulate copper sulphide used to prepare the sorbent may be sourced commercially or may be prepared by a number of methods. Suitable methods include roasting of copper or a copper compound with elemental sulphur, solvothermal processes, hydrothermal processes (e.g. microwave irradiation), electrodeposition techniques, precipitation of copper sulphide from solution, sulphiding of copper compounds using hydrogen sulphide, by electron irradiation, or by a mechanochemical process in which powdered copper metal is mixed with elemental sulphur under conditions that cause the elemental copper and elemental sulphur to react to form one or more copper sulphides. Such methods are described in the *Materials Research Bulletin*, vol 30, no 12, p 1495-1504, 1995.

Copper sulphides that may be used include Copper (II) sulphide, CuS, (covellite) and/or substoichiometric copper sulphides, e.g. of formula $Cu_{2-x}S$ where x is 0-1, such as $Cu_9S_5$ (digenite). One or more copper sulphides may be used. Copper sulphides high in CuS are preferred, and the overall S:Cu atomic ratio of the particulate copper sulphide is preferably ≥0.8, more preferably ≥0.9, most preferably ≥0.95. Desirably, essentially all of the sulphided copper in the sorbent is in the form of copper (II) sulphide, CuS. The particulate copper sulphide may be in the form of a powder, preferably a preferably a powder with an average particle size, i.e. $D_{50}$, in the range 5-100 μm, especially 5-50 μm.

The copper sulphide content of the sorbent may be in the range 0.5-75% by weight (expressed as CuS in the dried material), but we have found that materials with low levels of copper sulphide are as effective in capturing heavy metals as conventional sorbent materials. Therefore the copper sulphide content of the sorbent is preferably 5-45% by weight (expressed as CuS in the dried material).

The coating mixture comprises a particulate copper sulphide and one or more binders. The same or different binders as used in the agglomerates may be used. The total binder content of the coating mixture may be in the range 5-20% by weight, but is preferably 5-15% by weight. In particular we have found that a coating mixture comprising a particulate copper sulphide and a clay binder as the sole binder, to be particularly effective in preparing attrition resistant sorbents. Thus the coating mixture may be free of cement binder.

Other components may also be present in the coating mixture to enhance the physical properties or performance of the sorbent. Aluminas, such as transition aluminas including gamma alumina, and/or hydrated aluminas such as alumina trihydrate or boehmite may be included in the coating mixture. The amount of the alumina or hydrated alumina may be in the range 1-15% wt of the coating mixture. Other such additives include zinc compounds such as zinc oxide, zinc carbonate or zinc hydroxycarbonate, or other transition metal compounds may be included. However, where high water-tolerance of the sorbent is required, the metal sulphide content of the sorbent, other than copper sulphide, is preferably ≤5% by weight, more preferably ≤1% wt, most preferably ≤0.5% wt, especially ≤0.1% wt (based on the dried sorbent).

The coating mixture may be prepared by simply mixing the particulate copper sulphide and one or more binders, and optionally other components, using conventional blending techniques.

The coating mixture is combined with the agglomerates to form coated agglomerates that have a layer of particulate copper sulphide on their surface. This may be achieved by simply adding the coating mixture to the agglomerates as they are tumbled in the granulator. The coated agglomerates may be formed with or without adding additional liquid. Minimizing the amount of liquid used advantageously reduces their drying time and reduces the possibility of forming agglomerates of the coating mixture itself which is undesirable. Furthermore, minimising water addition may reduce the formation of undesirable copper sulphates. Similarly, applying the coating mixture to the agglomerates under a dry and/or non-oxidising atmosphere, such as oxygen-free nitrogen, may also help reduce the formation of sulphates. Additional liquid may however be required where the agglomerates are dried and/or aged. The amount of liquid used may be 0.1 to 0.5 ml/g of coating mixture. Aqueous or non-aqueous liquids may be used, but water is preferred. The liquid may be conveniently added by spraying.

The size of the coated agglomerates is largely determined by the size of the agglomerates. Thus the coated agglomerates preferably have a diameter in the range 1-15 mm.

The copper sulphide is present in a layer on the surface of the agglomerate. The thickness of the layer in the dried material may be in the range 1 to 1000 μm (micrometers), but preferably is in the range 1-500 micrometers, more preferably 1-250 micrometers. Thinner layers make more efficient use of the applied copper.

A particularly preferred sorbent comprises a particulate copper sulphide coated, along with a clay binder and optionally an alumina or alumina trihydrate, as a surface layer of 1 to 1000 μm thickness on the surface of agglomerates formed from a particulate hydrated alumina support material, bound together with a cement binder and a clay binder.

The coated agglomerates are dried. The drying temperature is preferably kept ≤200° C., more preferably ≤150° C. to avoid bulk decomposition of the copper sulphide. Drying temperatures up to 120° C. are more preferred, for example the coated agglomerate may conveniently be dried at about 70-120° C. Drying times may be in the range 0.25-16 hours. Drying under a non-oxidising atmosphere such as dry nitrogen may reduce sulphate formation.

The dried sorbent may be sieved to give a desired size fraction.

The sorbent may be used to treat both liquid and gaseous fluid streams containing heavy metals, in particular fluid streams containing mercury and/or arsenic. In one embodiment, the fluid stream is a hydrocarbon stream. The hydrocarbon stream may be a refinery hydrocarbon stream such as naphtha (e.g. containing hydrocarbons having 5 or more carbon atoms and a final atmospheric pressure boiling point of up to 204° C.), middle distillate or atmospheric gas oil (e.g. having an atmospheric pressure boiling point range of 177° C. to 343° C.), vacuum gas oil (e.g. atmospheric pressure boiling point range 343° C. to 566° C.), or residuum (atmospheric pressure boiling point above 566° C.), or a hydrocarbon stream produced from such a feedstock by e.g. catalytic reforming. Refinery hydrocarbon steams also include carrier streams such as "cycle oil" as used in FCC processes and hydrocarbons used in solvent extraction. The hydrocarbon stream may also be a crude oil stream, particularly when the crude oil is relatively light, or a synthetic crude stream as produced from tar oil or coal extraction for example. Gaseous hydrocarbons may be treated using the process, e.g. natural gas or refined paraffins or olefins, for example. Off-shore crude oil and off-shore natural gas streams in particular may be treated with the sorbent. Contaminated fuels such as petrol or diesel may also be treated. Alternatively, the hydrocarbon may be a condensate such as natural gas liquid (NGL) or liquefied petroleum gas (LPG), or gases such as a coal bed methane, landfill gas or biogas. Gaseous hydrocarbons, such as natural gas and associated gas are preferred.

Non-hydrocarbon fluid streams which may be treated using the sorbent include carbon dioxide, which may be used in enhanced oil recovery processes or in carbon capture and storage, solvents for decaffeination of coffee, flavour and fragrance extraction, solvent extraction of coal etc. Fluids, such as alcohols (including glycols) and ethers used in wash processes or drying processes (e.g. triethylene glycol, monoethylene glycol, Rectisol™ Purisol™ and methanol), may be treated by the inventive process. Mercury may also be removed from amine streams used in acid gas removal units. Natural oils and fats such as vegetable and fish oils may be treated by the process of the invention, optionally after further processing such as hydrogenation or transesterification e.g. to form biodiesel.

Other fluid streams that may be treated include the regeneration gases from dehydration units, such as molecular sieve off-gases, or gases from the regeneration of glycol driers.

The sorbent is of utility where the fluid stream contains water, preferably in low levels in the range 0.02 to 1% vol. Higher levels up to 5% vol may be tolerated for short periods. The sorbents may be regenerated simply after prolonged exposure to water simply by purging with a dry gas, preferably a dry inert gas such as nitrogen.

Preferably the absorption of heavy metal is conducted at a temperature below 150° C., preferably at or below 120° C. in that at such temperatures the overall capacity for heavy metal absorption is increased. Temperatures as low as 4° C. may be used. A preferred temperature range is 10 to 60° C. The gas hourly space velocity through the sorbent may be in the range normally employed.

Furthermore, the present invention may be used to treat both liquid and gaseous fluid streams containing one or more reductants such as hydrogen and/or carbon monoxide, notably hydrogen. In one embodiment, the fluid stream is a liquid hydrocarbon stream containing dissolved hydrogen and/or carbon monoxide. In another embodiment, the fluid stream is a gaseous stream containing hydrogen and/or carbon monoxide, i.e. a reducing gas stream. Gas streams that may benefit from this process include synthesis gas streams from conventional steam reforming processes and/or partial oxidation processes, and synthesis gas streams from a coal gasifier, e.g. as part of a IGCC process, after gas washing and heat recovery (cooling) steps, and before the sour shift stage. Other streams that may benefit from the present invention include refinery vent streams, refinery cracker streams, blast furnace gases, reducing gases, particularly hydrogen-rich gas streams, ethylene-rich streams and liquid or gaseous hydrocarbon streams, e.g. naphtha, fed or recovered from hydrotreating processes, such as hydrodesulphurisation or hydrodenitrification.

In use, the sorbent may be placed in a sorption vessel and the fluid stream containing heavy metal is passed through it. Desirably, the sorbent is placed in the vessel as one or more fixed beds according to known methods. More than one bed may be employed and the beds may be the same or different in composition.

The invention is further described by reference to the following Examples.

EXAMPLE 1

Agglomerates were prepared according to the following recipe (all parts by weight).
100 parts aluminium trihydrate powder ($D_{50}$ 10 μm)
7 parts Ciment Fondu (calcium aluminate)
7 parts Attagel 50 (attapulgite clay)

The dry powders were mixed to ensure homogeneity before employing a granulation technique where the mixed powder was combined with water (0.2 ml/g mixture) and mixed to form agglomerates in an Eirich™ granulator. The resulting agglomerates were designated material A.

A mixture of commercially sourced reagent-grade copper (II) sulphide powder (99.8% wt CuS, 100 parts by weight) ($D_{50}$ 42 μm) and Attagel 50 (10 parts by weight) was applied directly onto material A in a granulator with a little water and then dried immediately in a laboratory fluid bed drier at 105° C. to give sorbent B loaded with 15% wt copper sulphide (10% wt copper).

The method was repeated to give sorbent C loaded with 15% wt copper sulphide (10% wt copper). The method was repeated with a larger amount of copper sulphide to give sorbent D loaded with 27% wt copper sulphide (18% wt copper).

EXAMPLE 2

Agglomerates of material A were prepared according to the method described in Example 1.
A mixture of commercially sourced reagent-grade copper (II) sulphide powder (99.8% wt CuS, 100 parts by weight) ($D_{50}$ 42 μm), Attagel 50 (10 parts by weight) and alumina trihydrate (10 parts by weight) was applied directly onto material A in a granulator with a little water and then dried immediately in a laboratory fluid bed drier at 105° C. to give sorbent E loaded with 15% copper sulphide (10% copper).

EXAMPLE 3

Agglomerates of material A were prepared according to the method described in Example 1.

A copper sulphide powder was made by milling together copper powder and sulphur powder (Cu:S atomic ratio 1:0.9) until conversion to a covellite-rich copper sulphide was achieved.

A mixture of the copper sulphide powder (100 parts by weight) (D50 5-10 μm) and Attagel 50 (10 parts by weight) was applied directly onto material A in a granulator with a little water and then dried immediately in a laboratory fluid bed drier at 105° C. to give sorbent G loaded with 15% wt copper sulphide (10% wt copper).

EXAMPLE 4

Agglomerates of material A were prepared according to the method described in Example 1.

A copper sulphide powder was made by sulphiding granules of basic copper carbonate in a stream of 1% vol $H_2S$ in nitrogen until fully sulphided. The resulting copper sulphide granules, consisting essentially of CuS, were then ground to form a fine powder.

A mixture of the copper sulphide powder (100 parts by weight) and Attagel 50 (10 parts by weight) was applied directly onto material A in a granulator with a little water and then dried immediately in a laboratory fluid bed drier at 105° C. to give sorbent H loaded with 15% wt copper sulphide (10% wt copper).

EXAMPLE 5

Sorbents B, G and H were individually charged (sieved to a 2.80-3.35 mm size fraction, volume 25 ml) to a stainless steel reactor (21 mm ID). A flow of 100% vol natural gas was passed through a bubbler containing elemental mercury to allow the gas to pick up the mercury. The mercury-laden gas was then passed downwards through the reactor under the following conditions.

Pressure: 10 barg

Temperature 30° C.

Gas flow 110.2 NL·hr−1

Contact time 8 seconds

Test duration 690 hours

Samples from the reactor inlet and exit were periodically analysed for mercury content by atomic fluorescence detection. The inlet gas had a mercury concentration of about 1100 μg/m$^3$. The sorbents B, G and H reduced the mercury content of the exit gas to below detectable limits throughout the test. At the end of each test the 25 ml sorbent bed was discharged as 9 discrete sub-beds which were ground completely and analysed by acid digestion/ICP-OES to determine total mercury content. The amount of mercury captured by each sorbent bed is shown in Table 1.

TABLE 1

|  |  | Sorbent B | Sorbent G | Sorbent H |
|---|---|---|---|---|
| Mercury Loading, wt % | Bed 1 (inlet) | 1.88 | 1.88 | 1.80 |
|  | Bed 2 | 1.23 | 1.00 | 1.11 |
|  | Bed 3 | 0.46 | 0.46 | 0.60 |
|  | Bed 4 | 0.22 | 0.11 | 0.41 |
|  | Bed 5 | 0.14 | 0.09 | 0.15 |
|  | Bed 6 | 0.05 | 0.02 | 0.05 |
|  | Bed 7 | 0.02 | 0.01 | 0.02 |
|  | Bed 8 | <0.01 | <0.01 | 0.02 |
|  | Bed 9 (exit) | <0.01 | <0.01 | <0.01 |

All sorbents are effective for the removal of mercury. Sorbent G prepared by mechanochemical mixing of Cu and S gave the sharpest profile

EXAMPLE 6

Sorbents C, D and E were tested for physical strength and attrition resistance. The crush strength of 20 granules of each sorbent sieved to a 3.35-4.00 mm size fraction, was measured using an Engineering Systems C53 to calculate mean crush strength based on a normal distribution. The attrition loss, DrTL, was measured by rotating 100 g of each sorbent through 1800 total revolutions at 60 rpm for 30 minutes according to the ASTM method D4058-96. The DrTL is reported as a percentage of the original mass.

|  | Mean Crush Strength, kgF | Attrition Loss, wt % |
|---|---|---|
| Sorbent C | 1.64 | 1.4 |
| Sorbent D | 1.66 | 0.5 |
| Sorbent E | 1.85 | 0.9 |

All sorbents display exhibit good strength and attrition resistance.

A higher loading of copper sulphide (thicker layer) appears to provide increased attrition resistance. The incorporation of alumina trihydrate into the copper sulphide layer also gave improved strength and attrition resistance.

What is claimed is:

1. A method for preparing a sorbent comprising the steps of:
   (i) mixing an inert particulate support material and one or more binders to form a support mixture,
   (ii) shaping the support mixture in a granulator using a liquid to form agglomerates,
   (iii) without drying the agglomerates, coating the agglomerates with a coating mixture powder comprising a particulate copper sulphide and one or more binders to form a coated agglomerate by adding the coating mixture to the agglomerates in the granulator, and
   (iv) drying the coated agglomerate to form a dried sorbent.
2. The method according to claim 1, wherein the inert particulate support material is alumina, a metal-aluminate, silicon carbide, silica, titania, zirconia, zinc oxide, an aluminosilicate, zeolite, a metal carbonate, carbon, or a mixture thereof.
3. The method according to claim 1, wherein the inert particulate support material is an alumina or hydrated alumina.
4. The method according to claim 1, wherein the inert particulate support material is in the form of a powder with a $D_{50}$ particle size in the range of 1-100 μm.
5. The method according to claim 1, wherein the binder is a clay binder, cement binder, or organic polymer binder.
6. The method according to claim 1, wherein the binder is a combination of a cement binder and a clay binder.
7. The method according to claim 6, wherein the relative weights of the cement and clay binders is in the range 1:1 to 3:1 (first to second binder).
8. The method according to claim 1, wherein the total amount of the binder in the agglomerate is in the range of 5-30% by weight.
9. The method according to claim 1, wherein agglomerates have a diameter in the range of 1-15 mm.
10. The method according to claim 1, wherein the particulate copper sulphide material is manufactured by roasting copper or a copper compound with elemental sulphur, precipitating copper sulphide from solution, sulphiding a copper compound using hydrogen sulphide, or mixing powdered copper metal with elemental sulphur under conditions that cause the elemental copper and elemental sulphur to react to form one or more copper sulphides.
11. The method according to claim 1, wherein the copper sulphide comprises copper (II) sulphide and/or substoichiometric copper sulphides of formula $Cu_{2-x}S$ where x is 0-1.
12. The method according to claim 1, wherein the particulate copper sulphide has a S:Cu atomic ratio of ≥0.8.
13. The method according to claim 1, wherein the particulate copper sulphide is in the form of a powder with an average particle size, $[D_{50}]$, in the range of 5-100 μm.
14. The method according to claim 1, wherein the copper sulphide content of the sorbent is in the range of 0.5-75% by weight (expressed as CuS in the dried sorbent).
15. The method according to claim 1, wherein the total binder content of the coating mixture is in the range of 5-20% by weight.
16. The method according to claim 1, wherein the coating mixture comprises a particulate copper sulphide and a clay binder as the sole binder.
17. The method according to claim 1, wherein the copper sulphide is present as a layer on the surface of the agglomerate and the thickness of the layer in the dried sorbent is in the range 1 to 1000 μm.
18. The method according to claim 1, wherein the sorbent comprises a particulate copper sulphide coated, along with a clay binder and optionally an alumina and/or hydrated alumina, as a surface layer of 1 to 1000 μm thickness on the surface of agglomerates formed from a particulate hydrated alumina support material, bound together with a cement binder and a clay binder.
19. The method according to claim 1, wherein the coating mixture further comprises an alumina and/or hydrated alumina.
20. The method according to claim 1, wherein the coating mixture is applied to the agglomerates under a dry and/or non-oxidising atmosphere.
21. The method according to claim 1, wherein the coated agglomerate is dried at 70-150° C.
22. A sorbent obtained by the method of claim 1.
23. A process for removing a heavy metal from a fluid stream, comprising contacting the fluid stream with a sorbent prepared according to claim 22.

* * * * *